Nov. 27, 1951     G. L. FLANAGAN     2,576,393
AUTOMATIC SOLDERING IRON
Filed Jan. 9, 1950     2 SHEETS—SHEET 1
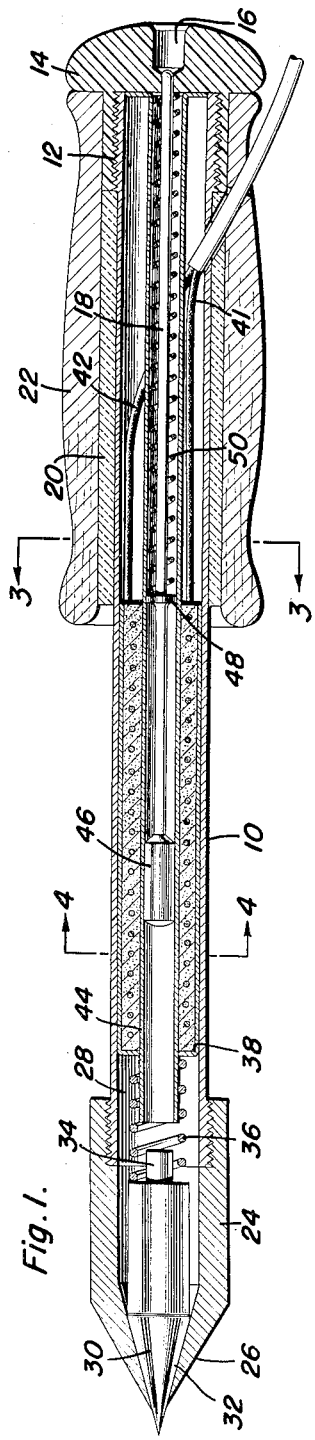
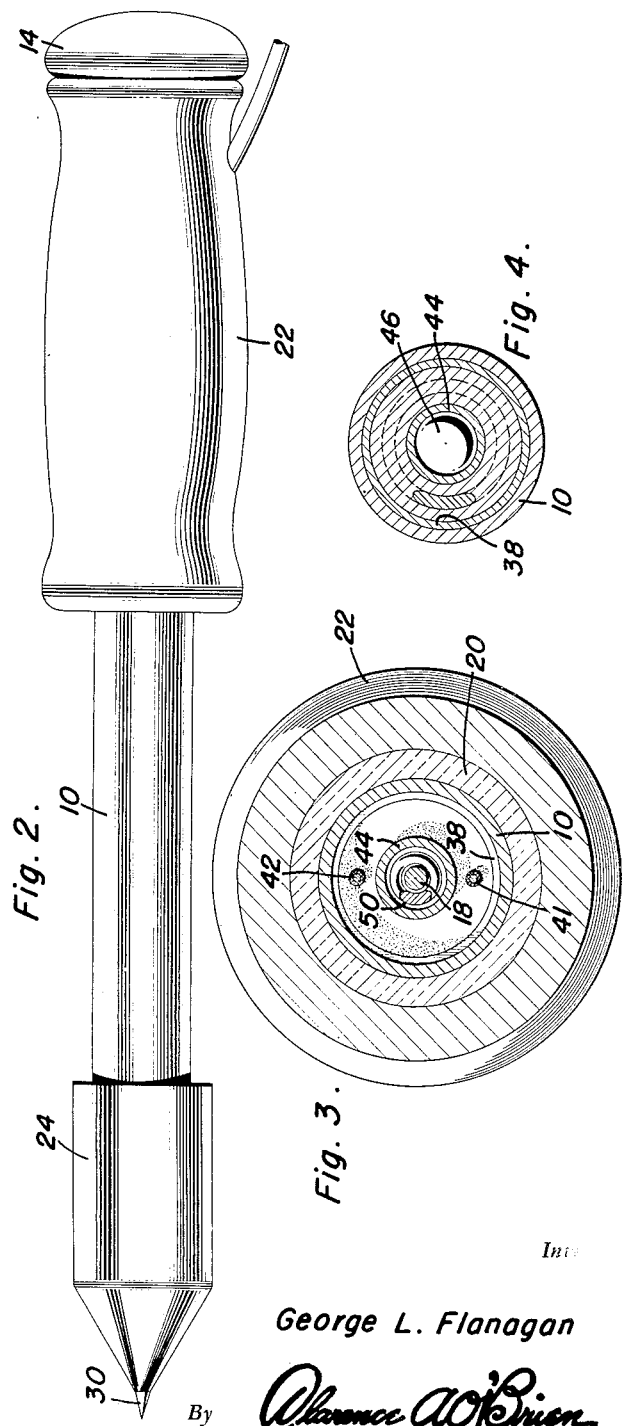
George L. Flanagan
By *Clarence A. O'Brien and Harvey B. Jacobson*
Attorneys Nov. 27, 1951  G. L. FLANAGAN  2,576,393
AUTOMATIC SOLDERING IRON
Filed Jan. 9, 1950  2 SHEETS—SHEET 2
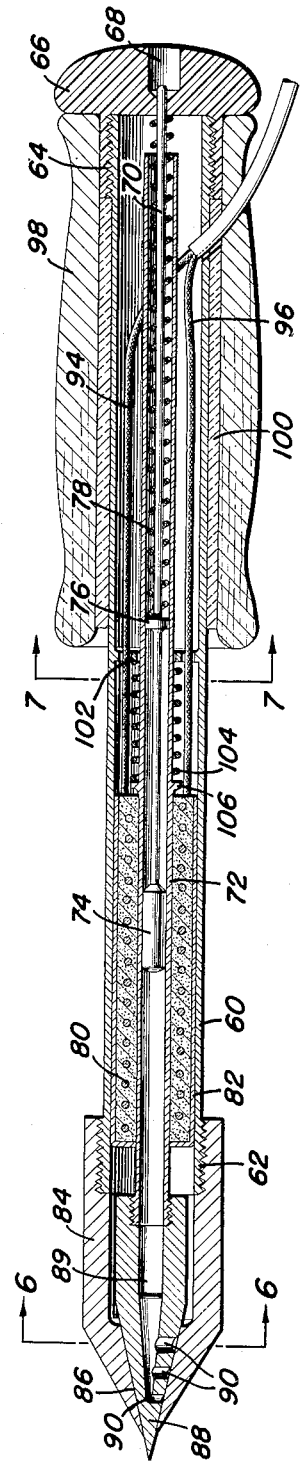
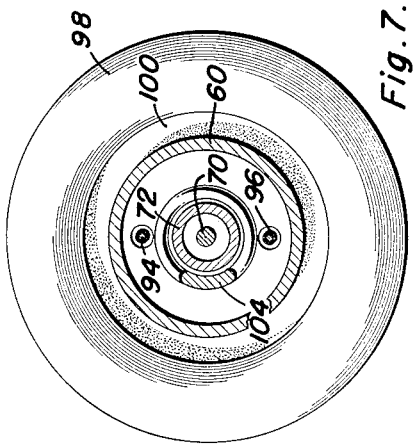
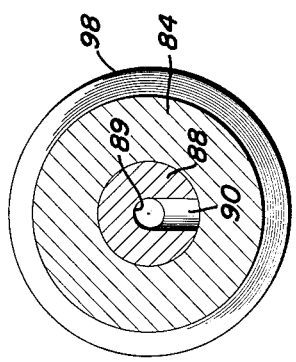
Inventor
George L. Flanagan
By *Clarence A. O'Brien and Harvey B. Jackson*
Attorneys Patented Nov. 27, 1951

2,576,393

UNITED STATES PATENT OFFICE 2,576,393

AUTOMATIC SOLDERING IRON

George L. Flanagan, Benton City, Wash.

Application January 9, 1950, Serial No. 137,548

3 Claims. (Cl. 219—27)

This invention relates to novel improvements in soldering irons.

An object of this invention is to more easily and successfully apply solder in the appropriate places by means of an improved mechanism or structure which feeds solder from a chamber through a cup at the end of the soldering iron which has a solder passage therein; a tip being operably disposed in the passage and movable against the opposing force of a spring, constantly pressing the tip to the passage closing condition in order to seal the passage when the soldering iron is not being employed as, at the end of a seam.

Ancillary objects and features will become apparent to those skilled in the art, in following the description of the illustrated forms of the invention.

In the drawings:

Figure 1 is a longitudinal sectional view of one form of the invention;

Figure 2 is an elevational view of the device shown in Figure 1;

Figure 3 is a transverse view taken on the line 3—3 of Figure 1;

Figure 4 is a transverse view taken on the line 4—4 of Figure 1;

Figure 5 is a longitudinal sectional view of another form of the invention;

Figure 6 is a transverse view taken on the line 6—6 of Figure 5 and in the direction of the arrows, and;

Figure 7 is a transverse sectional view taken on the line 7—7 of Figure 5.

The instant invention deals with soldering irons and has for its general purpose, the improvement in the art of soldering by means of a structure which renders soldering easier and more accurate.

I have illustrated two forms of my invention as preferable ones. However, many other adaptations of the instant concept may be employed.

Referring first to Figures 1-4 a shank 10 is illustrated as being made of tubular stock and has an externally threaded end 12. A cap 14 is threadedly disposed on the threaded end portion 12 and has a central passage 16 therein accommodating the plunger rod 18.

An insulating material sleeve 20 is disposed on the outside surface of the sleeve or shank 10 and forms a seat for the handle 22, which is preferably made of wood.

A cup 24, which in the illustrated instance has a frustum of a cone shaped end portion 26 thereon, is threaded to the lower threaded end portion of the shank 10. A solder chamber 28 is defined by the cup and a portion of the shank 10 and is adapted to maintain a supply of solder.

A tip 30 having a conical end portion is disposed in the tapered passage 32 and forms a valve therefor. This tip has a stud 34 projected therefrom in order to form a guide for the spring 36.

The spring 36 reacts on the tip constantly pressing it in the passage closing condition and also on the filament holder 38, which is disposed in the shank 10. The filament holder has an electrical filament therein which is fed by means of the wires 41 and 42 which pass through suitable openings in the handle assembly.

A tube 44 preferably copper, is disposed in concentric relationship with the shank 10 and also with the heating element. This tube also forms a portion of the solder chamber 28 and has a plunger 46 slidable therein. This plunger has said shank 18 fixed thereto. There is a collar 48 intermediate the ends of the rod 18 in order to form a seat for the spring 50 which reacts on the cap 14. The spring 50 constantly presses the plunger downwardly in order to place the solder under pressure in the solder chamber. In order to adjust the spring, it is necessary only to rotate the cap 14 on its threads.

In operation, the solder in the chamber 28 is heated and the tip 30 is pressed inwardly through the solder passage to allow solder to flow therethrough for application on the work.

If it is desired, the plunger feature may be removed from this form of the invention or the form of the invention illustrated in Figure 5 and the device operated as a soldering iron in the absence thereof.

In Figure 5 there is a shank 60 having threads 62 at one end and threads 64 at the other end. A cap 66, similar to the cap 14 is disposed on the threads 64 and has a central passage 68 formed therein in order to form a guideway for the rod 70. This rod is disposed in the tube 72 and has a plunger 74 slidable therein. The collar 76 forming a seat for the spring 78 is identical in structure and function to the collar 48. The spring 78 serves the same function as the spring 50.

A heating element shield 80 is disposed on the heating element 82, which is located in the shank 60. The cup 84 which is threaded on the threads 62 has a solder passage or passageway 86 passing through an opening at the end thereof in order to seat the valve and tip 88 combination. This tip has a central passage 89 or a plurality of off centered passages therein with transverse passages 90 communicating therewith in order to conduct solder laterally of the tip for alternate passage through the passageway 86.

The lower end of the tube 72 is threaded in the tip 88 and has its bore communicating with the passage 89. Accordingly, solder placed under pressure by the plunger 74 is pressed outwardly through the passageway.

The heating element 80 is fed by means of the wires 94 and 96 which pass through suitable openings in the handle assembly which includes the handle member 98 and insulating sleeve 100.

An apertured plate 102 is disposed in the shank 60 and forms a seat for the spring 104. This spring reacts on the collar 106 which is fixed on the outside surface of the tube 72 whereby the tube is pressed outwardly of the shank thereby pressing the tip 88 into sealing relationship with the passage 86 at all times, until the tip is urged inwardly by pressing against the work or workpiece.

Having described the invention, what is claimed as new is:

1. A soldering iron comprising a shank which has a handle at one end, a tube concentrically disposed within said shank and having communication with a solder chamber in said shank, a tip disposed in said solder chamber and a cup carried by said shank forming a part of said solder chamber, said cup having a solder outlet passage therein with said tip disposed in valving relationship therewith, a spring reacting on said shank and said tip urging said tip to the passage closing condition, a heating element disposed in concentric relationship with said tube and disposed within said shank in order to electrically heat said chamber, and a spring operated plunger operable in said tube pressing toward said tip in order to compress solder towards said solder passage, said tip being a hollow shell and having laterally disposed openings through the wall thereof communicating the interior of the tip with the solder passageway in said cup, the interior of said tip communicating with the bore of said tube in order to conduct solder.

2. The combination of claim 1 and said tip being secured to one end of said tube, said tube having a flange thereon seating the spring for pressing said tip to the solder passage closing condition.

3. A soldering iron comprising a shank which has a handle at one end, threads at the opposite end, a cup disposed on said threads and having a passage therein, a tip movably disposed in said passage in valving relationship therewith, a tube disposed in said shank and attached to said tip, a heating element arranged between said tube and the interior surface of said shank, a spring, means disposed on said tube for seating said spring, means fixed to said shank for seating the opposite end of said spring, said spring embracing said tube and constantly urging said tip into passage closing position, a solder feed plunger having a head thereon and disposed in said tube, a spring urging said plunger towards said tip, and a closure at the end of said shank opposite from said cup and constituting a seat for said last mentioned spring.

GEORGE L. FLANAGAN.

REFERENCES CITED

The following references are of record in the file of this patent:

UNITED STATES PATENTS

| Number | Name | Date |
| --- | --- | --- |
| 801,193 | Howard et al. | Oct. 3, 1905 |
| 1,127,970 | Dryfoos | Feb. 9, 1915 |
| 1,596,432 | Henson | Aug. 17, 1926 |
| 1,714,385 | Lofthouse | May 21, 1929 |
| 1,928,129 | Hornack | Sept. 26, 1933 |
| 1,957,325 | Davis | May 1, 1934 |
| 2,135,764 | Oleson | Nov. 8, 1938 |
| 2,272,780 | Schweyer | Feb. 10, 1942 |
| 2,380,138 | Abramson | July 10, 1945 |
| 2,452,360 | Dunham | Oct. 26, 1948 |